(12) United States Patent
Koike

(10) Patent No.: US 7,559,617 B2
(45) Date of Patent: *Jul. 14, 2009

(54) PRINTER

(75) Inventor: Yoshikazu Koike, Suwa (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/903,128

(22) Filed: Sep. 20, 2007

(65) Prior Publication Data

US 2008/0024533 A1    Jan. 31, 2008

Related U.S. Application Data

(62) Division of application No. 11/088,040, filed on Mar. 23, 2005, now Pat. No. 7,354,128.

(30) Foreign Application Priority Data

Mar. 30, 2004    (JP)    ............................. 2004-099577

(51) Int. Cl.
*B41J 29/38* (2006.01)
*G03G 15/00* (2006.01)

(52) U.S. Cl. .............................. 347/14; 347/9; 399/395

(58) Field of Classification Search ................... 347/14, 347/9; 399/395
See application file for complete search history.

(56) References Cited

U.S. PATENT DOCUMENTS

| 3,949,282 | A | 4/1976 | Coberley |
|---|---|---|---|
| 5,266,976 | A | 11/1993 | Ohigashi et al. |
| 6,155,669 | A | 12/2000 | Donahue et al. |
| 2002/0191991 | A1* | 12/2002 | Yamanaka et al. .......... 399/299 |
| 2008/0024538 | A1* | 1/2008 | Koike .......................... 347/14 |

FOREIGN PATENT DOCUMENTS

| JP | 10-035021 | 2/1998 |
|---|---|---|
| JP | 11079343 | 3/1999 |

* cited by examiner

*Primary Examiner*—Stephen D Meier
*Assistant Examiner*—Sarah Al-Hashimi
(74) *Attorney, Agent, or Firm*—Harness, Dickey & Pierce, P.L.C.

(57) ABSTRACT

A printer for printing on a medium on an endless belt by printer heads includes: a generator generating printing data for each printer head; a detector detecting time-series data for the meandering of the medium; a generator generating correction data preventing disorder of a printed image due to the meandering; and a controller operating each printer head according to the correction and printing data, wherein the correction-data generator selects a specific difference between factors in the time when the time-series and predetermined time-series data are related and newly generates correction data corresponding to the selected factor, a replacement section replaces a factor in the time corresponding to the specific factor of the reference time-series data with the specific factor, and the time-series-data detector has a stop stopping detection of the time-series data when the absolute change value of a physical value influencing meandering is a predetermined value or less.

4 Claims, 9 Drawing Sheets

PRINTER

CROSS-REFERENCE TO RELATED APPLICATIONS

This application is a divisional of U.S. patent application Ser. No. 11/088,040 filed on Mar. 23, 2005 now U.S. Pat. No. 7,354,128, which claims the benefit of Japanese Patent Application No. 2004-099577 filed Mar. 30, 2004. The disclosures of the above applications are incorporated herein by reference.

BACKGROUND OF THE INVENTION

1. Field of the Invention

The present invention relates to a printer for sequentially performing printing on a printing medium by a plurality of printer heads.

2. Description of Related Art

A printer is conventionally known which has a plurality of printer heads capable of printing different colors and sequentially prints a printing sheet by the printer heads.

Moreover, some of the above printers are respectively constituted so that disorder of a printed image due to meandering of a printing sheet is prevented. For example, JP10-35021A discloses that a resist mark is printed on the both margins of a printing sheet when the first color is printed, the meandering state of the printed resist mark is detected when each color is printed from the second color downward and thereby the meandering state of the printing sheet is detected to properly move the position of each printer head so that each color is printed at a proper position in accordance with the meandering state of the printing sheet.

However, in the case of the above prior art, when printing is performed on a printing sheet, detection of the position of a resist mark and operation of a moving distance of the position of each printer head are performed for each printing sheet. Therefore, the time required for printing of each printing sheet increases. When the number of sheets to be printed is large, there is a problem that the printing speed is extremely decreased.

The present invention is made to solve unsolved problems of the above conventional printer and its object is to provide a printer capable of improving the printing speed.

SUMMARY OF THE INVENTION

To solve the above problems, a printer of first invention is a printer for sequentially performing printing on a printing medium carried by an endless belt applied to a plurality of rollers by a plurality of printer heads arranged at different positions along the carrying direction of the printing medium, which has a printing-data generation section for generating the printing data to be printed by each printer head, time-series data detection section capable of detecting the time-series data for the meandering value of the printing medium, correction-data generation section for generating the correction data for preventing disorder of a printed image due to the meandering of the printing medium in accordance with the detected time-series data, and head control section for operating each printer head in accordance with the generated correction data and the printing data generated by the printing-data generation section, and in which the correction-data generation section selects a specific factor of the time-series data in accordance with the difference between factors in the time at which the time-series data detected by the time-series-data detection section and the predetermined reference time-series data are related to each other and newly generates correction data corresponding to the selected specific factor. To select a specific factor of the time-series data for the meandering value of a printing medium, there are the following methods: a method for selecting a factor in which the absolute value of the difference is larger than a set value, a method for selecting a predetermined number of factors or a half of the predetermined number of factors from the factors in which the absolute value of the difference larger than the set value, and a method for selecting a factor in the predetermined time before or after the time corresponding to the factor having the largest absolute value of the difference.

Moreover, in the case of a printer of second invention, when the correction data is newly generated, a factor in the time corresponding to the correction data generated by the correction-data generation section is replaced with a factor of the time-series data corresponding to the time.

Furthermore, in the case of a printer of third invention, the time-series-data detection section detects the time-series data for the meandering value of the printing medium by detecting the time-series data for the meandering value of the endless belt passing through the vicinity of each printer head while rotating the endless belt.

Furthermore, in the case of a printer of fourth invention, the time-series-data detection section has a position detection section for detecting the position of the width-directional end of the endless belt and belt time-series-data detection section for detecting the time-series data for the meandering value of the endless belt in accordance with the detected position.

According to these first to fourth inventions, by using a pair of correction data values to print a plurality of printing media, it is possible to decrease the time for generating correction data. Therefore, it is possible to decrease the time for printing each printing medium compared to EL method for generating correction data for each printing medium. As a result, it is possible to improve a printing speed even when a lot of sheets to be printed are present. Moreover, when meandering states of a printing medium are changed, it is possible to prevent disorder of a printed image due to meandering of a printing medium for a long time. Furthermore, when newly generating correction data, it is possible to decrease the time for generating the correction data by newly generating (updating) only a part of the correction data and further improve a printing speed.

Furthermore, in the case of a printer of fifth invention, the correction-data generation section calculates the average value of the specific factors in the time at which a plurality of time-series data detected by the time-series-data detection section are related to each other and newly generates the correction data in accordance with the calculated average value.

According to the fifth invention, it is possible to remove a fluctuation from the time-series data for the meandering value of a printing medium. Therefore, by using correction data generated by time-series data free from fluctuation to print a printing medium, it is possible to properly prevent disorder of a printed image due to meander of a printing medium.

Moreover, in the case of a printer of sixth invention, the time-series-data detection section has a detection stop section for stopping detection of the time-series data when the absolute value of a change value of a physical value influencing the meander state of the printing medium is a predetermined value or less.

Furthermore, in the case of a printer of seventh invention, the detection stop section stops detection of the time-series data when the elapsed time after the correction data is generated by the correction-data generation section is a predetermined value or less.

Furthermore, in the case of a printer of eighth invention, the detection stop section stops detection of the time-series data when the number of sheets to be printed after the correction data is generated by the correction-data generation section is a predetermined value or less.

According to these sixth to eighth inventions, it is possible to stop detection of the time-series data when the meandering state of a printing medium is hardly changed. Therefore, by detecting time-series data only when the state is changed, it is possible to decrease the time for detecting time-series data and further improve a printing speed while properly printing disorder of a printed image due to meandering of a printing medium.

Moreover, in the case of a printer of ninth invention, the detection stop section calculates a present estimated value of the difference in accordance with the difference calculated in the past by the correction-data generation section and sets the predetermined threshold value in accordance with the calculated estimated value and the present difference calculated by the correction-data generation section.

According to the ninth invention, when the absolute value of the difference between meandering values of a printing medium is larger than the absolute value of an estimated value, that is, when the meandering state of the printing medium is kept in a state to be easily changed, it is possible to increase the detection frequency of time-series data by setting a predetermined threshold value to a small value. Moreover, when the absolute value of the difference is smaller than the absolute value of the estimated value, that is, when the meandering state of the printing medium is kept in a stage to be hardly changed, it is possible to decrease the detection frequency of the time-series data and further decrease the time for detecting the time-series data by setting the predetermined value to a large value.

Furthermore, in the case of a printer of tenth invention, the time-series-data detection section detects the time-series data when power is applied to the printer.

According to the tenth invention, when power is applied to the printer of its own, it is possible to generate new correction data. Therefore, even if meandering states of a printing medium are changed during the period from the time when the power supply of the printer is cut off to the time when the power supply is turned on again, it is possible to properly prevent the disorder of a printed image due to measuring of the printing medium by using the new correction data.

DETAILED DESCRIPTION OF THE PREFERRED EMBODIMENTS

A line printer which is an embodiment of a printer of the present invention is described below by referring to the accompanying drawings.

First Embodiment

Figure 1A:
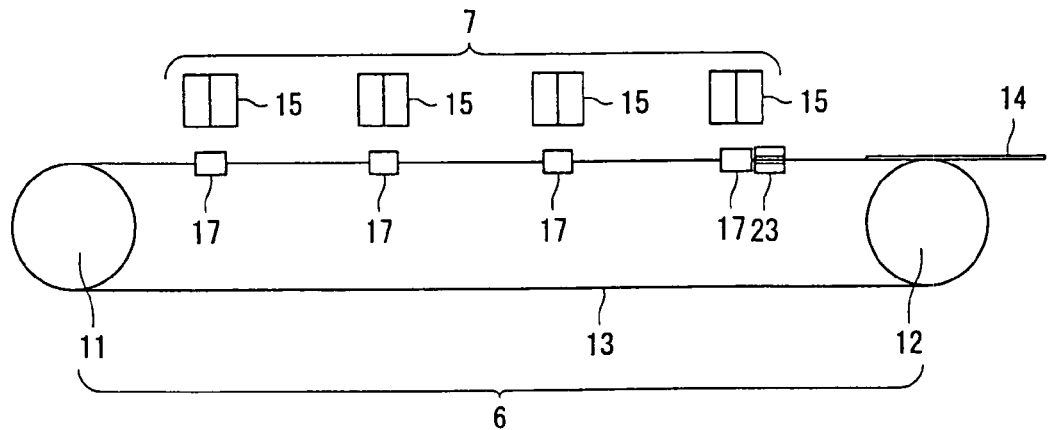
FIGS. 1A and 1B are a side view and a top view of an embodiment of first embodiment.
Figure 1B:
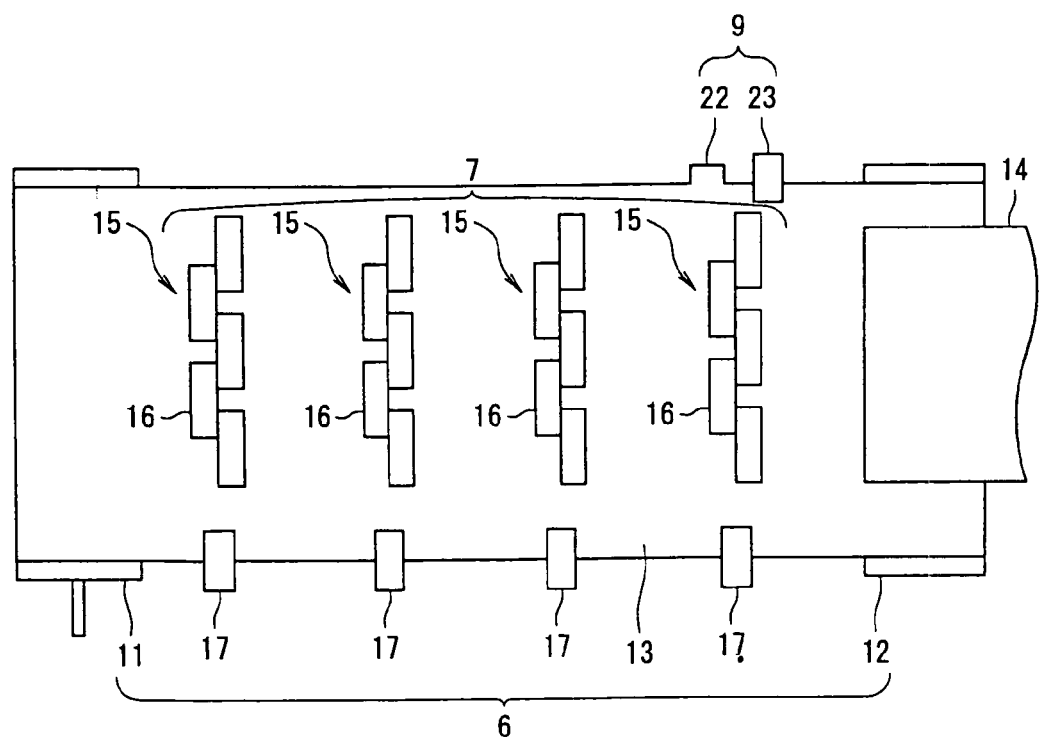
Figure 2:
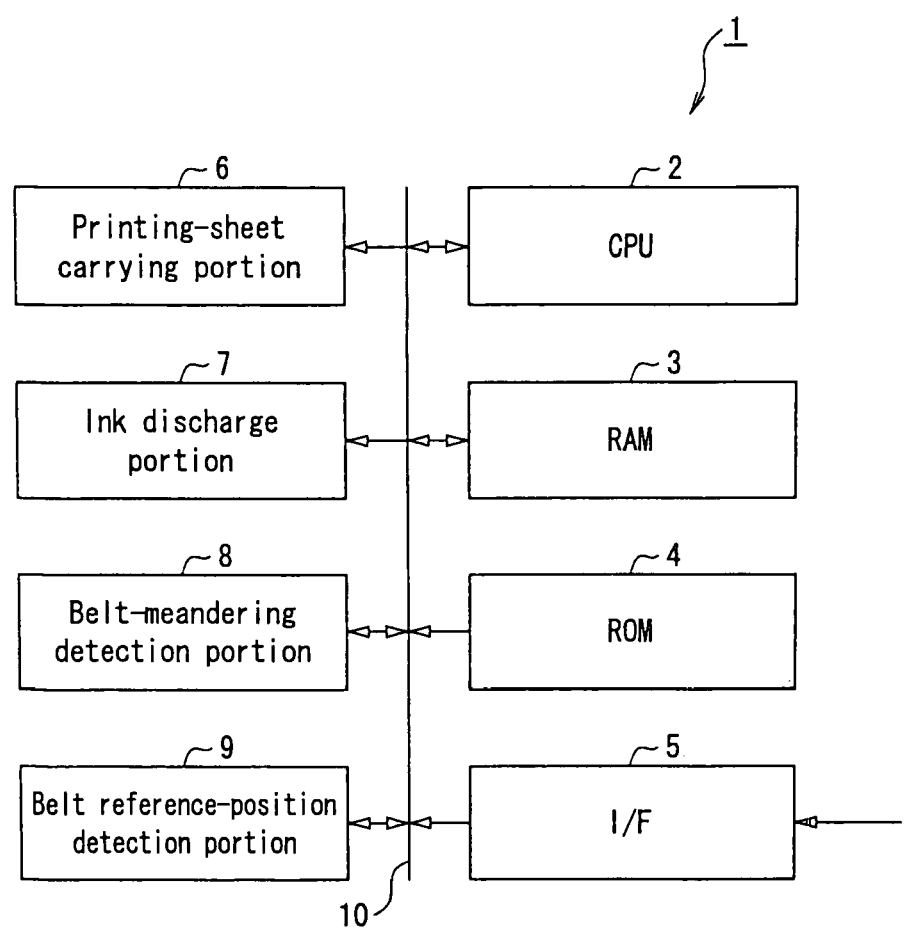
FIG. 2 is a block diagram showing an internal configuration of the line printer 1 in FIGS. 1A and 1B.

<Configuration of Line Printer>
FIGS. 1A and 1B are a side view and a top view showing the appearance of a line printer of first embodiment and FIG. 2 is a block diagram showing an internal configuration of the line printer of the first embodiment. As shown in FIG. 2, the line printer 1 is constituted by including a CPU (Central Processing Unit) 2, RAM (Random Access Memory) 3, ROM (Read Only Memory) 4, I/F (InterFace) 5, printing-sheet carrying portion 6, ink discharge portion 7, belt meandering detection portion 8, and belt reference-position detection portion 9 and the portions are mutually connected by a bus 10 so that data can be supplied and received.

Among these portions, the CPU 2 reads various programs and data from the ROM 4 when a printing execution instruction (to be described later) from the I/F 5, develops the programs in a work area formed in the RAM 3, and executes the printing execution processing for controlling the portions so that the information on an image or a character corresponding to the printing execution instruction (to be described layer) is printed.

Moreover, the RAM 3 forms a work area for developing various programs to be executed by the CPU 2 and forms a memory region for storing the data for the programs. Furthermore, when a read request is output from the CPU 2, the RAM 3 outputs the stored data to the CPU 2 in accordance with the read request.

Furthermore, the ROM 4 stores the programs and data to be executed by the CPU 2. Then, when a read request is output from the CPU 2, the ROM 4 outputs stored various programs and data to the CPU 2.

Furthermore, the I/F 5 is connected with a personal computer (not illustrated) for outputting the data for the information to be printed by the line printer 1. Furthermore, when the data for the information from the personal computer (not illustrated), the I/F 5 outputs an instruction (hereafter referred to as "printing execution instruction") for making the line printer 1 print the information corresponding to the data to the CPU 2.

Furthermore, as shown in FIGS. 1A and 1B, the printing-sheet carrying portion 6 is constituted by including a driving roller 11 to be rotation-driven by a servo motor (not illustrated), a follower roller 12 having the same diameter as the driving roller 11 and freely rotatable, and an endless belt 13 applied to the rollers 11 and 12. Furthermore, an attraction section (not illustrated) for attracting the printing sheet 14 to the surface of the endless belt 13 is included. Furthermore, the peripheral length of the endless belt 13 is an integral multiple of the diameter of the driving roller 11.

Furthermore, when a printing control instruction (to be described later) is output from the CPU 2, the printing-sheet carrying portion 6 rotation-drives the driving roller 11 at a constant speed, rotates the endless belt 13, feeds the printing sheet 14 to a specific position at the center of the endless belt 13 so that the front ends are arranged in the straight line extended in the direction orthogonal to the sheet feed direction on the basis of an index 22 (to be described later), and carries the printing sheet 14 while attracting the printing sheet 14.

Furthermore, the ink discharge portion 7 is constituted by including four printer heads 15 arranged above the endless belt 13. These printer heads 15 are constituted so that a plurality of sub-printer heads 16 shorter than the width of the printing sheet 14 range over the width of the printing sheet 14. Furthermore, the sub-printer heads 16 are arranged at different positions along the direction in which the printing sheet 14 is carried (hereafter referred to as sheet feed direction) and a plurality of nozzles capable of discharging one color ink of black, cyan, magenta, and yellow from the downstream side of the sheet feed direction vertically downward in order are formed on the down side respectively. Furthermore, these nozzles are arranged so that nozzles of the same printer head 15 are arranged in two lines in the direction orthogonal to the sheet feed direction and nozzles at corresponding positions of different printer heads 15 are arranged in one line in the sheet feed direction.

Furthermore, when a printing control instruction (to be described later) is output from the CPU 2, the ink discharge portion 7 discharges ink drips from each nozzle at the timing, frequency, and dot size (such as three sizes of L, M, and S) corresponding to the printing control instruction (to be described later) to print the information corresponding to the printing control instruction (to be described later) on a printing sheet carried by the endless belt 13.

Furthermore, the belt meandering detection portion 8 is constituted by including four photo sensors 17 arranged correspondingly to the printer heads 15 respectively. These photo sensors 17 respectively have a light-emitting diode set to the upside of the endless belt 13 at the left end toward the sheet feed direction (downstream direction) of the endless belt 13 and a light-receiving diode set to the down side of the endless belt 13. Then, the photo sensors 17 respectively detect the degree at which the left end of the endless belt 13 interrupts the portion between the light-emitting diode and the light-receiving diode and the position of the left end of the endless belt 13 in accordance with the detected degree. Then, by subtracting a change value of the position of the left end of the endless belt 13 due to a shape error of the left end previously measured, that is, a change value of the position of the left end when the endless belt 13 does not meander from the detected position, the time-series data for the meandering value of the endless belt 13 passing through the vicinity of each printer head 15 is detected.

Then, when a meandering-state detection instruction (to be described later) is output from the CPU 2, the belt meandering detection portion 8 rotation-drives the driving roller 11 at a constant speed, makes each photosensor 17 detect the meandering value of the endless belt 13 while rotating the endless belt 13, and detects the time-series data for the meandering value of the endless belt 13 immediately under each printer head 15.

Furthermore, the belt reference-position detection portion 9 is constituted by including an index 22 formed at the right end of the endless belt 13 and an index detection sensor 23 for detecting that the index 22 passes through the vicinity of the printer head 15 at the most upstream side in the sheet feed direction. Then, when the index detection sensor 23 passes through the index 22, the belt reference-position detection portion 9 outputs an instruction for starting carrying of the printing sheet 14 (hereafter also referred to as "printing sheet carrying start instruction" to the CPU 2.

<Content of Printing Execution Processing>

Then, the printing execution processing to be executed by the CPU 2 is described below in accordance with the flowchart in FIG. 3. The printing execution processing is a processing to be executed whenever a predetermined time passes when a printing execution instruction is output from the I/F 5. First, in step S101 of the processing, an instruction for detecting the meandering state of the endless belt 13 (hereafter also referred to as "meandering state detection instruction") to the belt meandering detection portion 8. When the arithmetic processing is first executed, the printing data including the timing and frequency for discharging ink drips, and dot size is generated for each nozzle and the generated printing data is stored in the RAM 3.

Then, instep S102, the detection result of the time-series data for the meandering value of the endless belt 13 by the belt meandering detection portion 8 is set to the time-series data of the printing sheet 14 immediately under each printer head 15, that is, the time-series data for the meandering value (hereafter also referred to as "printing-sheet meandering value") x of the printing sheet 14 at the elapsed time (hereafter also referred to as "carrying time") t after carrying of the printing sheet 14 is started.

Then, in step S103, the difference $\Delta x(t)$ between factors $(=xnew(t)-x'(t))$ in the time when the time-series data for the printing-sheet meandering value x set in step S102 is mutually related with the time-series data for the reference meandering value x' is calculated. In this case, graphs in FIGS. 4A to 4C use a detection result when the index detection sensor 23 detects passage of the index 22 as the origin, the elapsed time t as a positive value of the axis of abscissa, and the meandering value x to the right side toward the sheet feed direction as a positive value of the axis of ordinate.

Then, in step S104, the time corresponding to a factor whose absolute value among differences $\Delta x$ is larger than ½ of the pitch length of nozzles of the printer head 15 and the printing-sheet meandering value x of the printer head 15 (hereafter referred to as "specific factor") are detected. Then, the detected specific factor is divided by the pitch length and it is determined whether the quotient of the division is a positive value at the carrying time t immediately under the i-th (i=1 to 4) printer head 15. When the quotient is a positive value, correction data for shift-correcting the printing data stored in the RAM 3 is newly generated so that the printing data for each nozzle corresponding to the carrying time t of the i-th printer head 15 becomes the printing data corresponding to nozzles at the right side toward the sheet feed direction by integral values of the division results and a part of the correction data stored in the RAM 3 is replaced with the generated correction data. Moreover, when the quotient is a negative value, correction data for shift-correcting the correction data stored in the RAM 3 is newly generated so that the printing data for each nozzle corresponding to the carrying time t of the i-th printer head 15 becomes printing data corresponding to left side nozzles toward the sheet feed direction by integral values of the division results and a part of the correction data stored in the RAM 3 with the generated correction data. When this arithmetic processing is executed, correction data is generated by relating to all factors of the time-series data for the printing sheet 14. When the arithmetic processing is first executed, the reference time-series data x' in which all factors are set to "0" and the correction data are stored in the RAM 3.

Then, in step S105, the printing data stored in the RAM 3 is shift-corrected in accordance with the correction data generated in the above step S104, that is, the correction data stored in the RAM 3. Moreover, factors in the time corresponding to newly generated correction data among factors of the time-series data for the reference meandering value x' are replaced with factors of the time-series data for the printing-sheet meandering value x corresponding to the time.

Then in step S106, it is determined whether a printing-sheet carrying start instruction is output from the belt reference-position detection portion 9. When the instruction is output (Yes), step S107 is started. When the instruction is not output (No), the determination is repeatedly executed.

In the above step S107, a printing control instruction for discharging ink drips from each nozzle at the timing, frequency, and dot size corresponding to the printing data stored in the PAM 3 is output to the printing-sheet carrying portion 6 and ink discharge portion 7 and then, this arithmetic processing is completed.

<Operations of Line Printer>

Then, operations of the line printer 1 of this embodiment are described below in accordance with specific situations.

First, data for the information to be printed is output from a personal computer (not illustrated) and a printing execution instruction corresponding to the data is output by the I/F 5. Then, a printing execution processing is once executed by the CPU 2 and it is assumed that a pair of printing data values and correction data are stored in the RAM 3 and a predetermined time passes. Then, the printing execution processing is executed again by the CPU 2. As shown in FIG. 3, in step S101, a meandering state detection instruction is output and the meandering state of the endless belt 13 is detected by the belt meandering detection portion 8 while rotating the endless belt 14. Moreover, in step S102, the time-series data for a meandering value of the printing sheet 14 is set immediately under each printer head 15 in accordance with a detection result of the meandering value by the belt meandering detection portion 8 and in step S103, as shown in FIGS. 4A to 4C, the difference Δx between printing-sheet meandering values x at each time t is calculated for each printer head 15. Then, in step S104, as shown by circular marks in FIG. 4C, the time corresponding to a factor whose absolute value is larger than ½ of the nozzle length of the printer head 15 among the differences Δx and the printing-sheet meandering value x of the printer head 15 are detected and correction data for shift-correcting only the printing data corresponding to the printer head 15 is newly generated and a part of a pair of correction data values stored in the PAM 3 is replaced with the generated correction data. Moreover, in step S105, a pair of printing data values stored in the RAM 3 is shift-corrected in accordance with a pair of the correction data values. At the same time, only a factor in the time corresponding to newly generated correction data among factors of the time-series data for the reference meandering value x' is replaced with a factor of the time-series data for the printing-sheet meandering value x corresponding to the time.

Moreover, in this case, it is assumed that the index 22 passes through the vicinity of the index detection sensor 23. Then, a printing-sheet carrying start instruction is output from the belt reference-position detection portion 9, determination in step S106 becomes "Yes", and in step S107, a printing control instruction corresponding to a pair of printing data values stored in the RAM 3 is output. Then, a driving roller is rotation-driven at a constant speed by the printing-sheet carrying portion 6, the endless belt 13 rotates, the printing sheet 14 is fed to a specific position of the endless belt 13, and the attracted printing sheet 14 is carried to the lower portion of the printer head 15. At the same time, ink drips 7 are discharged from each nozzle at the timing, frequency, and dot size corresponding to the printing control instruction and the information corresponding to the printing control instruction, that is, the information corresponding to the data output from a personal computer (not illustrated) is properly printed on the printing sheet 14.

Thus, according to the line printer 1 of this embodiment, when printing a plurality of printing sheets 14, it is possible to decrease the time for generating correction data by using a pair of correction data values to print the printing sheets 14. Therefore, it is possible to decrease the time for printing each printing sheet 14 compared to the case of a method for generating correction data for each printing sheet 14 and as a result, even when there are many printing sheets, it is possible to improve the printing speed. When meandering states of the printing sheet 14 are changed, it is possible to prevent disorder of a printed image due to meandering of the printing sheet 14 for a long time. Moreover, when newly generating correction data, it is possible to decrease the time for generating the correction data and further improve the printing speed by newly generating (updating) only a part of the correction data.

Figure 5:
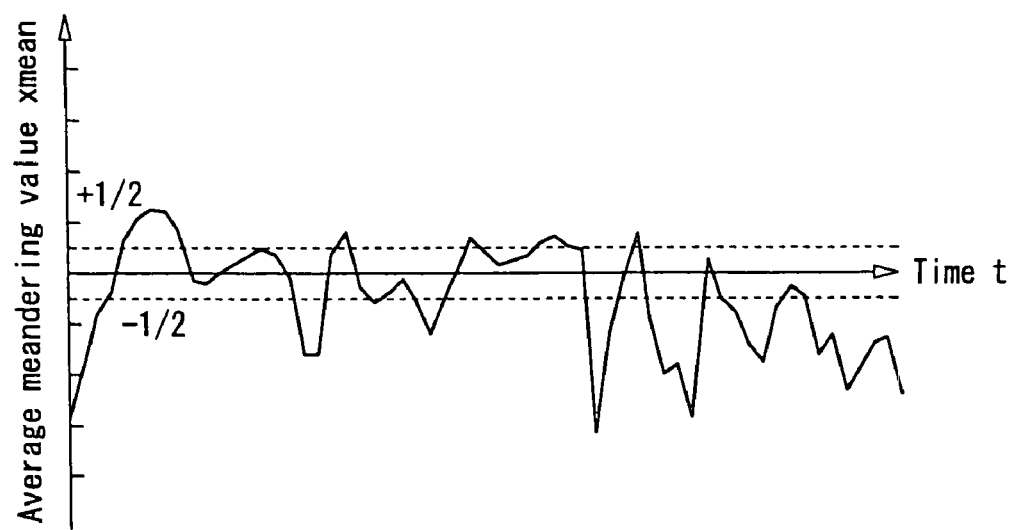
FIG. 5 is an illustration for explaining a modification of the present invention.

For this embodiment, only a case is shown in which correction data is generated in accordance with a specific factor of the time-series data for the printing-sheet meandering value x. However, this embodiment is not restricted to the above case. For example, it is also allowed to calculate the average value (hereafter referred to as "average meandering value xmean") of specific factors in the time when time-series data for the printing-sheet meandering value x for five circuits are related to each other and newly generate correction data in accordance with the calculated average meandering value xmean. Thus, as shown in FIG. 5, it is possible to remove fluctuation from the time-series data for the printing-sheet meandering value x. Therefore, it is possible to properly prevent the disorder of a printed image due to meandering of the printing sheet 14 by using the correction data generated by the time-series data free from fluctuation to print the printing sheet 14.

Figure 6:
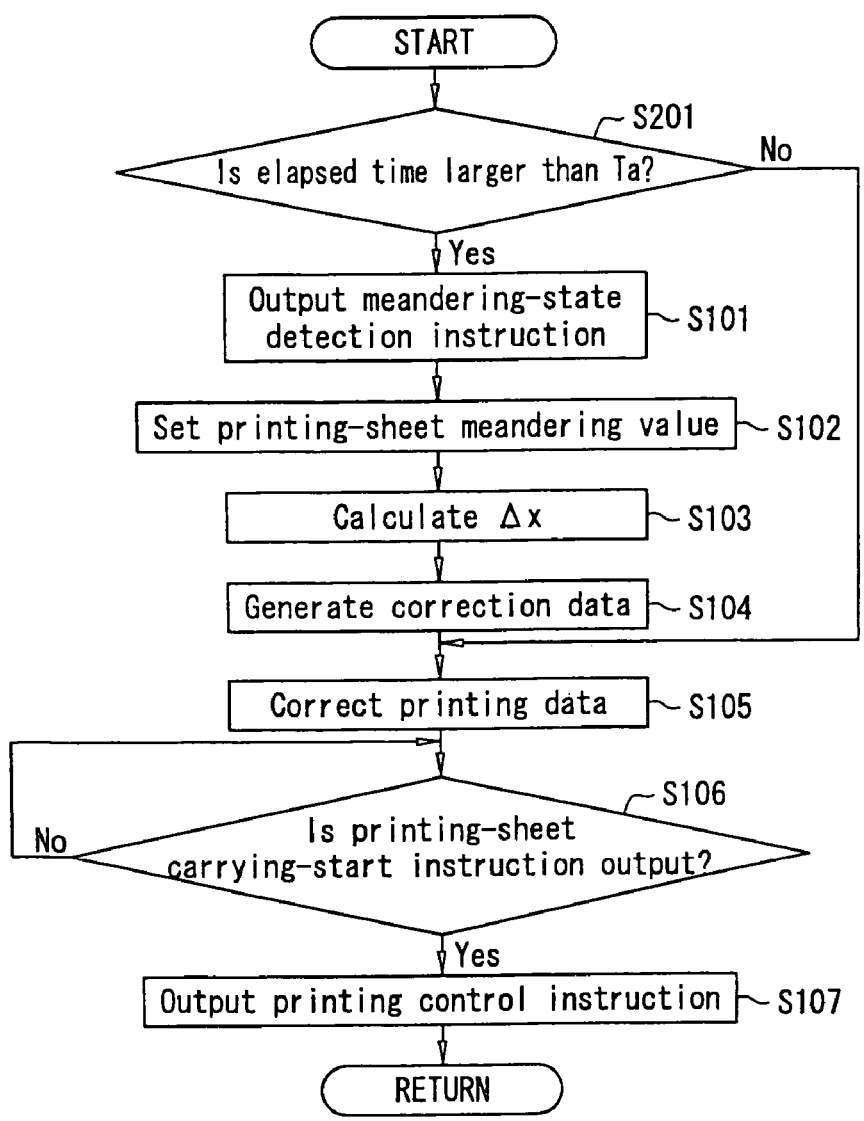
FIG. 6 is an illustration for explaining a modification of the present invention.

Moreover, a case is shown in which the time-series data for the meandering value of the endless belt 13 is detected whenever the printing execution processing is executed. However, this embodiment is not restricted to the above case. For example, when the absolute value of a change value of a physical value influencing the meandering state of the printing sheet 14 is a predetermined threshold value or less, it is also allowed to stop detection of the time-series data. Specifically, it is allowed to stop detection of the time-series data for the meandering value of the endless belt 13 until a predetermined time Ta passes after correction data is newly generated. That is, as shown in FIG. 6, it is allowed to determine whether an elapsed time T after correction data is generated is larger than the predetermined time Ta before step S101 for the printing execution processing, and when T is larger than the predetermined value Ta (Yes), restart the above step S101 and when T is Ta or less (Yes), use step S201 for shifting to step S105.

Figure 7:
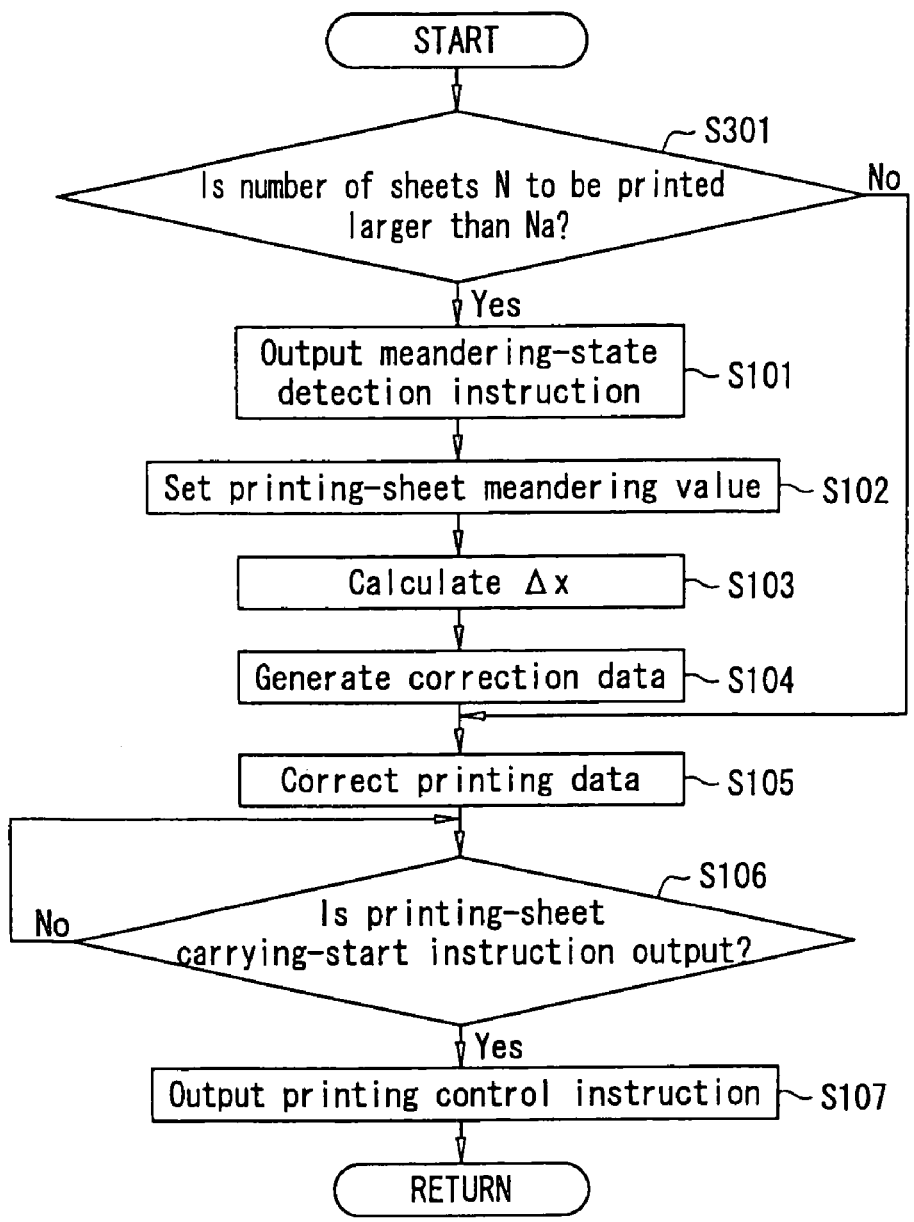
FIG. 7 is an illustration for explaining a modification of the present invention.

Moreover, it is allowed to stop detection of the time-series data for the meandering value of the endless belt 13 until a predetermined number of sheets Na to be printed are printed after correction data is generated. That is, as shown in FIG. 7, it is allowed to set step S301 for determining whether the number of sheets N to be printed after correction data is generated is larger than the predetermined number of sheets Na to be printed before step S101 for the printing execution processing, and when N is larger than the predetermined number of sheets Na to be printed (Yes), shift to the above step S101 and when N is the predetermined number of sheets to be printed or less (Yes), shift to step S105. Thus, it is possible to stop detection of time-series data when the meandering state of the printing sheet 14 is hardly changed. Therefore, by detecting time-series data only when meandering states are changed, it is possible to decrease the time for detecting the time-series data and further improve the printing speed while properly preventing disorder of a printed image due to meandering of the printing sheet 14.

Figure 8:
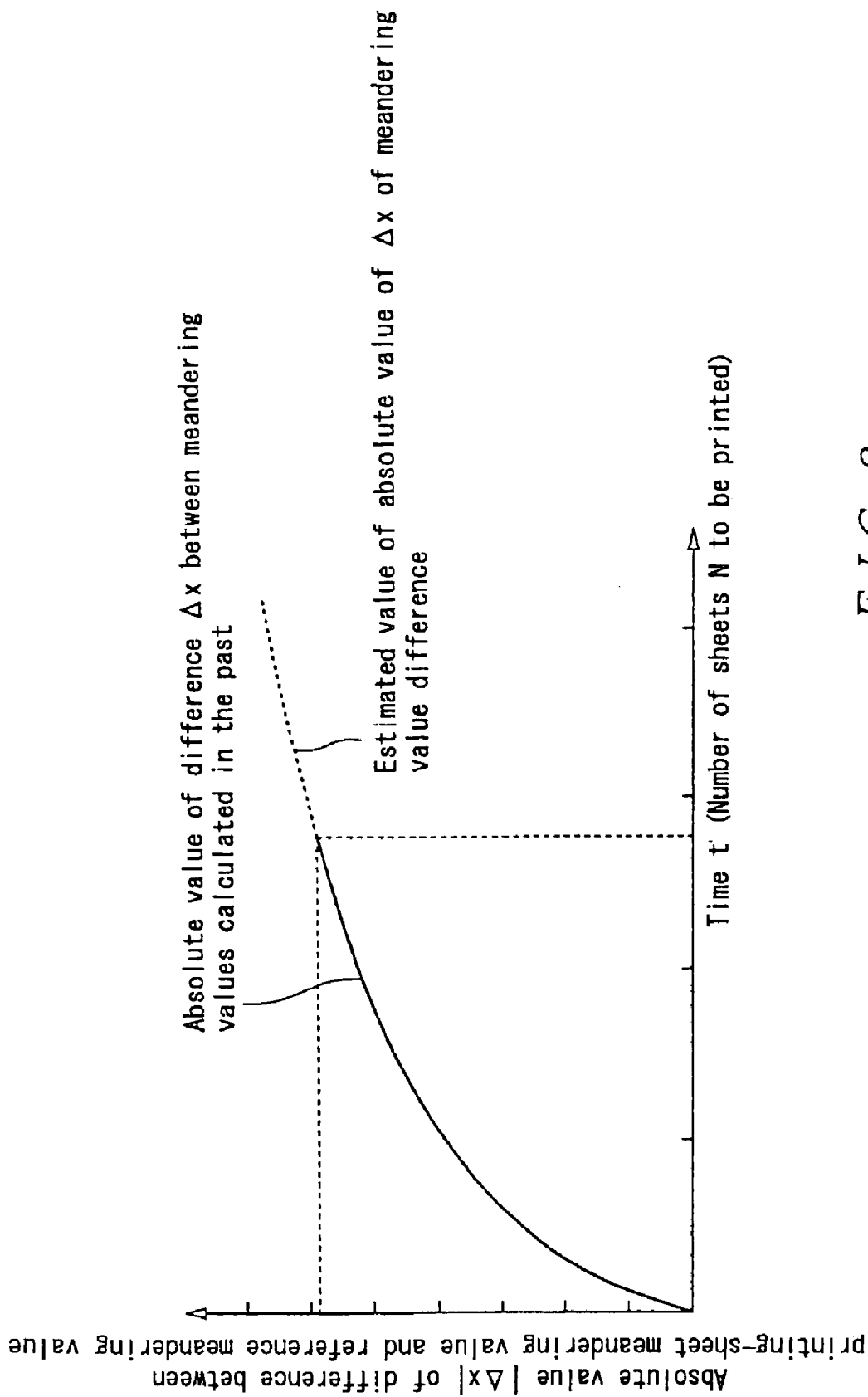
FIG. 8 is an illustration for explaining a modification of the present invention.
Figure 9:
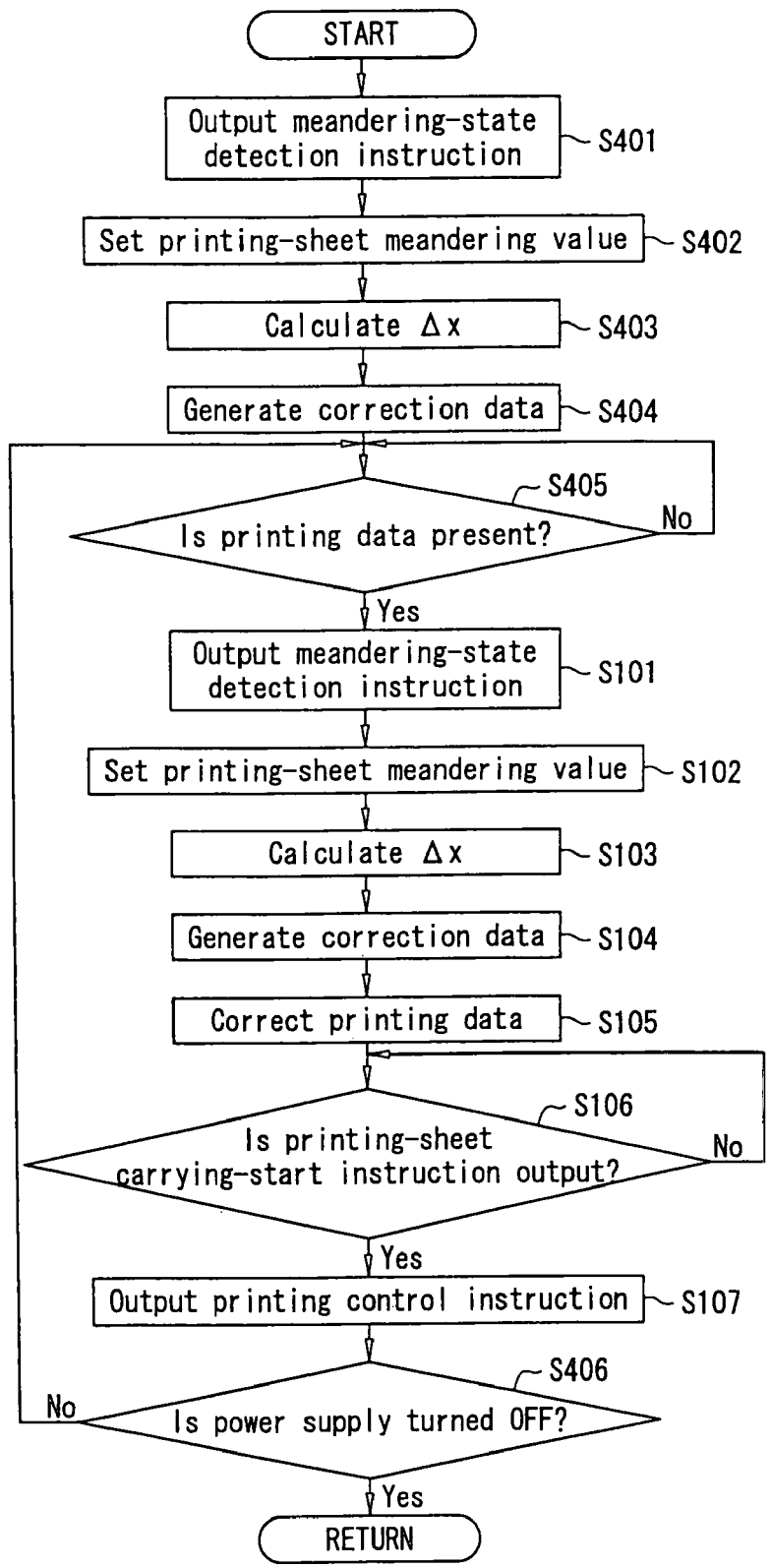
FIG. 9 is a flowchart of the printing execution processing by second embodiment.

Moreover, when the absolute value of a change value of a physical value influencing the meandering state of the printing sheet 14 is a predetermined threshold value or less and detection of the time-series data is stopped, it is also allowed to calculate an estimated value of the present difference Δx in accordance with the difference Δx between meandering values calculated in the past as shown in FIG. 8 and set predetermined threshold values (predetermined time Ta and predetermined number of sheets Na to be printed) in accordance with the calculated estimated value and the present actual difference Δx. Thus, when the absolute value of the difference between meandering values of the printing sheet 14 is larger than the absolute value of the estimated value, that is, when the meandering state of the printing sheet 14 is kept in an easily changeable state, it is possible to increase the detection frequency of time-series data by setting a predetermined threshold value to a small value. Moreover, when the absolute value of the difference Δx is smaller than the absolute value of the estimated value, that is, when the meandering state of the printing sheet 14 is kept in a state not to be easily changed, it is possible to decrease the detection frequency of time-series data by setting the predetermined threshold value to a large value and further decrease the time for detecting time-series data.

Second Embodiment

Then, a line printer 1 of second embodiment is described below.

This embodiment is different from the first embodiment in that the time-series data for the meandering value of the printing sheet 14 is detected when power is supplied to the printer. Specifically, when power is supplied to the printer, the CPU 2 is made to execute printing execution processing, steps S401 to S405 are added before step S101 for printing execution processing, and step 406 is added after step S107.

The second embodiment includes many configurations same as those of the first embodiment. The same configuration is provided with the same symbol and its detailed description is omitted.

First, in step S401, a meandering-state detection instruction is output to the belt meandering detection portion 8. When this arithmetic processing is first executed, printing data including the timing, frequency, and dot size for discharging ink drips for each nozzle is generated and the generated printing data is stored in the RAM 3 so that the information corresponding to a printing execution instruction output from the I/F 5 is printed on the printing sheet 14 carried by the printing-sheet carrying portion 6.

Then, step S402 is started to set a detection result of the time-series data for the meandering value of the endless belt 13 by the belt meandering detection portion 8 to the time-series data for the meandering value of the printing sheet 14 immediately under each printer head 15, that is, the time-series data for the printing-sheet meandering value x in the carrying time t.

Then, step S403 is started to calculate the difference Δx(t) between factors in the time in which the time-series data for the printing-sheet meandering value x set in the above step S402 and the time-series data for the reference meandering value x' are related to each other as shown in FIGS. 4A to 4C.

Then, step S404 is started to detect the time corresponding to a factor whose absolute value among the differences Δx calculated in the above step S403 is larger than ½ of the pitch length of nozzles of the printer head 15 and the printing-sheet meandering values x of the printer head 15. Then, the detected printing-sheet meandering values x are divided by the i(i=1-4)-th printer head from the upstream side in the sheet feed direction to determine whether the quotient of the division at the carrying time t immediately under the printer head 15 among the division results is a positive value. When the quotient is a positive value, only correction data for shift-correcting the printing data stored in the RAM 3 is newly generated so that the printing data for each nozzle corresponding to the carrying time t of the i-th printer head 15 becomes printing data corresponding to nozzles at the right side toward the sheet feed direction by integral values of the division results to replace a part of the correction data stored in the RAM 3 with the generated correction data. Moreover, when the quotient is a negative value, correction data for shift-correcting the printing data stored in the RAM 3 is newly generated so that the printing data for each nozzle corresponding to the carrying time t of the i-th printer head 15 becomes the printing data corresponding to left-side nozzles toward the sheet feed direction to replace a part of the correction data stored in the RAM 3 with the generated correction data. Then, step S405 is started to determine whether printing data is stored in the RAM 3. When the printing data is stored (Yes), step S101 is started but when the printing data is not stored in the RAM 3 (No), the determination is repeatedly executed.

However, in the above step S406, it is determined whether the power supply of the printer is cut off. When the power supply is cut off (Yes), this arithmetic processing is completed. When the power supply is not cut off (No), the above step S405 is started.

Thus, according to the line printer 1 of this embodiment, when power is supplied to the printer, it is possible to generate new correction data. Therefore, even if the meandering state of the printing sheet 14 is changed from the time when the power supply of the printer is turned off to the time when the power supply is turned on again, it is possible to properly prevent disorder of a printed image due to meandering of the printing sheet 14 by using the new correction data for printing.

Figure 3:
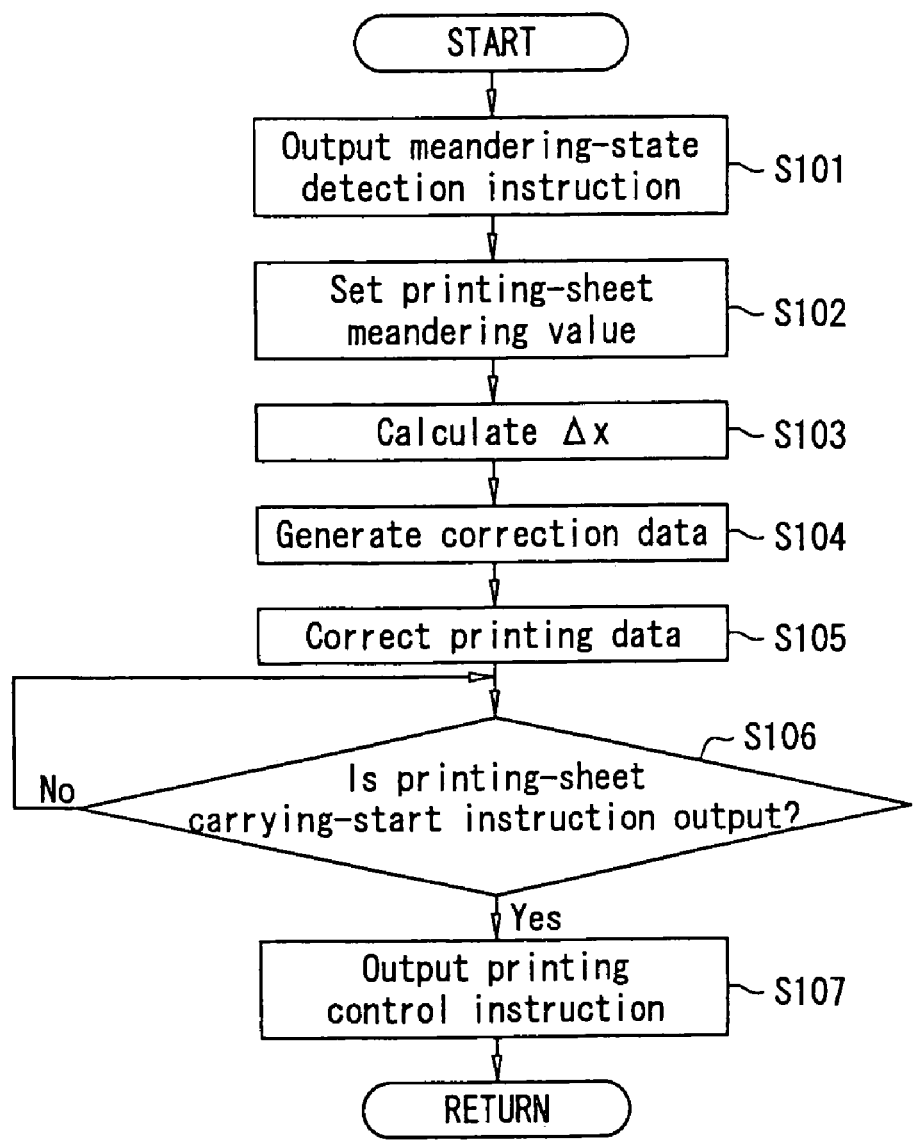
FIG. 3 is a flowchart of printing execution processing.
Figure 4A:
FIGS. 4A to 4C are illustrations for explaining operations of the first embodiment.
Figure 4B:
Figure 4C:
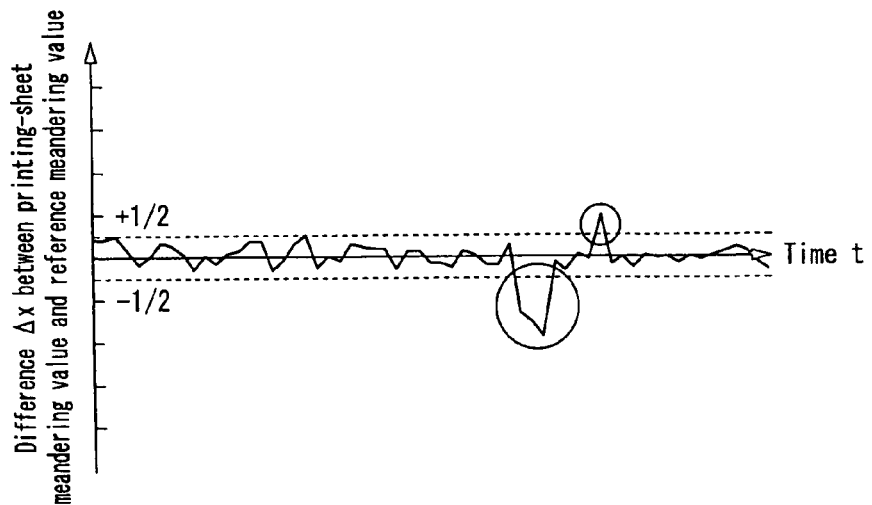

As described above, the CPU 2 in FIG. 2 and step S101 in FIG. 3 constitute the printing-data generation section in claims. Subsequently similarly, the photosensor 17 in FIGS. 1A and 1B, CPU 2 and belt meandering detection portion 8 in FIG. 2, steps S101 and S102 in FIG. 3 constitute a time-series-data detection section, the CPU 2 in FIG. 2 and steps S103 and S104 in FIG. 3 constitute a correction-data generation section, the CPU 2, printing-sheet carrying portion 6 and ink discharge portion 7 in FIG. 2, and steps S105 to S107 constitute a head control section, the photosensor 17 in FIGS. 1A and 1B, the CPU 2 and belt meandering detection portion 8 in FIG. 2, and steps S101 in FIG. 3 constitute a position detection section, and the CPU 2 in FIG. 2 and step S102 in FIG. 3 constitute a belt time-series-data detection section.

A printer of the present invention is not restricted to the contents of the above embodiments but modifications of the present invention are allowed as long as they are not deviated from the gist of the present invention.

For the above embodiments, a case is shown in which the ink discharge portion 7 is constituted by including a plurality of line heads. However, the present invention is not restricted to the case. For example, it is allowed to constitute the present invention by including a small serial head movable in the direction orthogonal to the sheet feed direction.

The entire disclosure of JP2004-099,577 filed Mar. 30, 2004 is incorporated by reference.

What is claimed is:

1. A printer for sequentially performing printing on a printing medium carried by an endless belt applied to a plurality of rollers by a plurality of printer heads arranged at different positions along the carrying direction, comprising:

a printing data generation section for generating printing data to be printed by each printer head;

a time-series-data detection section capable of detecting the time-series data for the meandering value of the printing medium;

a correction-data generation section for generating correction data for preventing disorder of a printed image due to meandering of the printing medium in accordance with the detected time-series data; and a head control section for operating each printer head in accordance with the generated correction data and the printing data generated by the printing-data generation section, wherein the correction-data generation section selects a specific difference between factors in the time when the time-series data detecting by the time-series-data section and predetermined time-series data are related to each other and newly generates correction data corresponding to the selected specific factor, and a replacement section is used which replaces a factor in the time corresponding to the specific factor among the factors of the reference time-series data with the specific factor, and wherein the time-series-data detection section has a detection stop section for stopping detection of the time-series data when the absolute value of a change value of a physical value influencing the meandering state of the printing medium is a predetermined threshold value or less.

2. The printer according to claim 1, wherein the detection stop section stops detection of the time-series data when the elapsed time after the correction data is generated by the correction-data generation section is a predetermined threshold value or less.

3. The printer according to claim 1, wherein the detection stop section stops detection of the time-series data when the number of sheets to be printed after the correction data is generated by the correction-data generation section is a predetermined threshold value or less.

4. The printer according to claim 1, wherein the detection stop section calculates the estimated value of the present difference in accordance with the difference calculated in the past by the correction-data generation section and sets the predetermined threshold value in accordance with the calculated estimated value and the present difference calculated by the correction-data generation section.

* * * * *